(12) United States Patent
Kim (10) Patent No.: US 8,416,432 B2
(45) Date of Patent: Apr. 9, 2013

(54) METHOD AND APPARATUS FOR AUTOMATICALLY ESTABLISHING CONNECTION IN WIRELESS COMMUNICATION NETWORK AND WIRELESS COMMUNICATION NETWORK USING THE SAME

(75) Inventor: Jin-hyung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1470 days.

(21) Appl. No.: 11/581,367

(22) Filed: Oct. 17, 2006

(65) Prior Publication Data
US 2007/0130296 A1 Jun. 7, 2007

(30) Foreign Application Priority Data

Dec. 7, 2005 (KR) .................. 10-2005-0119059

(51) Int. Cl.
*G06F 3/12* (2006.01)
(52) U.S. Cl.
USPC ....... 358/1.15; 370/329; 370/345; 455/552.1; 709/203; 709/220; 710/62
(58) Field of Classification Search .................. 358/1.15, 358/1.1, 1.14; 340/539.1; 345/156; 370/230, 370/329, 345, 464; 380/255; 455/39, 411, 455/550.1, 552.1, 556.1; 709/200, 203, 220, 709/227; 710/62
See application file for complete search history.

(56) References Cited

U.S. PATENT DOCUMENTS

| 5,697,061 | A * | 12/1997 | Krueger et al. ........... 455/39 |
| 5,923,757 | A * | 7/1999 | Hocker et al. ........... 345/156 |
| 6,832,082 | B1 * | 12/2004 | Ramaswamy et al. ........ 455/411 |
| 2001/0027486 | A1 * | 10/2001 | Takamoto et al. ........... 709/227 |
| 2002/0093424 | A1 * | 7/2002 | Parry ........................... 340/539 |
| 2003/0100335 | A1 * | 5/2003 | Gassho et al. ................ 455/552 |
| 2003/0179406 | A1 * | 9/2003 | Seto ............................. 358/1.15 |
| 2006/0058059 | A1 * | 3/2006 | Kim .......................... 455/550.1 |
| 2006/0152759 | A1 * | 7/2006 | Chen et al. .................... 358/1.15 |
| 2010/0002879 | A1 * | 1/2010 | Risley .......................... 380/255 |

FOREIGN PATENT DOCUMENTS

| JP | 2001-256154 | 9/2001 |
| JP | 2002-236561 | 8/2002 |
| JP | 2003-0163668 | 6/2003 |
| KR | 2001-0032987 | 4/2001 |
| KR | 1020030094729 | 12/2003 |
| KR | 10-2005-0104979 | 11/2005 |
| WO | WO 2005046130 A1 | 5/2005 |

* cited by examiner

*Primary Examiner* — King Poon
*Assistant Examiner* — David S Cammack
(74) *Attorney, Agent, or Firm* — Roylance, Abrams, Berdo & Goodman, L.L.P.

(57) ABSTRACT

Provided is a method and apparatus for establishing a wireless connection between devices to enable wireless data communication in a wireless communication network. The method includes: establishing the wireless connection with default wireless setting values; receiving currently set wireless setting values of an external device from the external device; and establishing the wireless connection using the received wireless setting values of the external device. Accordingly, when a user wants to establish a wireless connection between two devices to enable wireless data communication in a wireless communication network, by automatically matching wireless setting values of the two devices to each other using predefined default wireless setting values, the inconvenience of a user having to personally match the wireless setting values of the two devices is avoided. In particular, by automatically establishing a wireless connection between a printer server and a printer remote control device, convenience can be provided to a user using a network printer.

11 Claims, 5 Drawing Sheets

METHOD AND APPARATUS FOR AUTOMATICALLY ESTABLISHING CONNECTION IN WIRELESS COMMUNICATION NETWORK AND WIRELESS COMMUNICATION NETWORK USING THE SAME

CROSS-REFERENCE TO RELATED PATENT APPLICATION

This application claims the benefit under 35 U.S.C. §119(a) of Korean Patent Application No. 10-2005-0119059, filed on Dec. 7, 2005, in the Korean Intellectual Property Office, the entire disclosure of which is hereby incorporated by reference.

FIELD OF THE INVENTION

The present invention relates to a wireless communication network. More particularly, the present invention relates to a method and apparatus for establishing a wireless connection between devices to enable a wireless data communication in a wireless communication network.

DESCRIPTION OF THE RELATED ART

As a result of developments in wireless technologies, wireless communications can now be performed between various devices in a local area. Examples of wireless communication technologies include Bluetooth, wireless LAN (WLAN: IEEE 802.11), and BRAN (HiperLAN 1/2).

The expansion of the operable range of WLAN and the increased degree of integration of digital products has resulted in the development of new devices that perform the functions of several devices. Network printer systems having a printer server and a remote control device, which can perform wireless communication, have become available on the market. Such a network printer system can control a printing job for a printer using the remote control device or control the printing job by displaying images to be printed.

Figure 1:
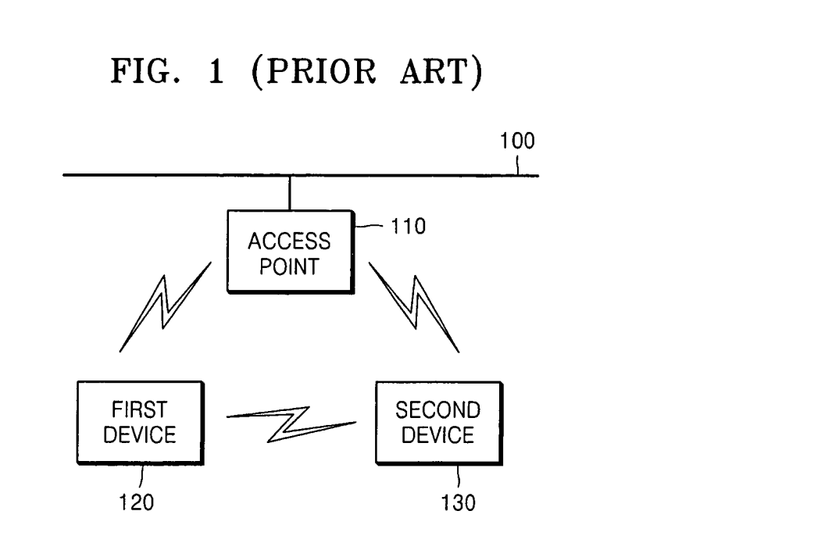
FIG. 1 is a block diagram of a typical wireless communication network system.

FIG. 1 is a block diagram of a conventional wireless communication network system. Referring to FIG. 1, when a wireless communication operation mode is an infrastructure mode, a first device 120 and a second device 130 exchange data with each other wirelessly via an access point 110. In this case, the first device 120 and the second device 130 can exchange data with each other via one or more access points 110 via an Ethernet 100. When the wireless communication operation mode is an ad-hoc mode, the first device 120 and the second device 130 exchange data directly with each other and not through the access point 110.

To enable wireless communication between two devices, e.g., a printer server and a remote control device, wireless set-up for the two devices must be performed. Wireless set-up is necessary because wireless data communication between the two devices can only occur if the wireless settings of the two devices are set up to be compatible with each other (e.g. match). Exemplary wireless settings consist of settings of an operation mode, network name (SSID), channel, authentication, and encryption.

Thus, for the wireless communication, a user must check the wireless settings of the two devices, and if the wireless settings are set differently, the user must ensure compatibility of the wireless settings of the two devices via a separate wired connection.

Accordingly, there is a need for an improved wireless connection set-up method and apparatus to establish a wireless connection between wireless communication devices.

SUMMARY OF THE INVENTION

Exemplary embodiments of the present invention address at least the above problems and/or disadvantages and provide at least the advantages described below. Accordingly, an aspect of the present invention is to provide an automatic wireless connection set-up method and apparatus to automatically establish a wireless connection between wireless communication devices when data communication is performed between the wireless communication devices in a wireless communication network.

According to an aspect of an exemplary embodiment of the present invention, there is provided a method of automatically establishing a wireless connection in a wireless communication network, the method comprising: establishing the wireless connection with default wireless setting values; receiving currently set wireless setting values of an external device from the external device; and establishing the wireless connection using the received wireless setting values of the external device.

The establishment of the wireless connection may comprise: sensing whether an event associated with the external device occurs; and if the occurrence of the event is sensed, establishing the wireless connection using the default wireless setting values. The event may be the external device being docked.

According to another aspect of an exemplary embodiment of the present invention, there is provided a method of automatically establishing a wireless connection in a wireless communication network, the method comprising: storing currently set wireless setting values in a storage unit; changing settings for the wireless connection with default wireless setting values; transmitting the wireless setting values stored in the storage unit to an external device; and changing the settings for the wireless connection from the default wireless setting values to the wireless setting values stored in the storage unit.

The changing of the settings of the wireless connection may comprise: sensing whether an event associated with the external device occurs; and if the occurrence of the event is sensed, establishing the wireless connection using the default wireless setting values.

According to another aspect of an exemplary embodiment of the present invention, there is provided an apparatus for automatically establishing a wireless connection in a wireless communication network, the apparatus comprising: an event detector for sensing whether an event with an external device occurs; a data transceiver for receiving currently set wireless setting values of the external device from the external device; and a connection establishment unit for establishing the wireless connection with default wireless setting values if the occurrence of the event is sensed, and for changing settings of the wireless connection to wireless setting values received from the external device if the wireless setting values are received from the external device.

The event may be that the apparatus is docked with the external device. The default wireless setting values may be values indicating that a wireless communication mode is an ad-hoc mode.

The data transceiver may transmit an acknowledgement (ACK) signal, which has information that the wireless setting values have been completely received, to the external device after receiving the wireless setting values from the external device. The external device may be one of a printer server and a printer remote control device.

According to another aspect of an exemplary embodiment of the present invention, there is provided an apparatus for automatically establishing a wireless connection in a wireless communication network, the apparatus comprising: an event detector for sensing whether an event with an external device occurs; a controller for storing currently set wireless setting values in a storage unit if occurrence of the event is sensed; a data transceiver for transmitting the wireless setting values stored in the storage unit to the external device; and a connection establishment unit for changing wireless setting values to default wireless setting values if the occurrence of the event is sensed, and for restoring the wireless setting values to the wireless setting values stored in the storage unit after the transmission of the wireless setting values are completed.

The event may be that the external device is docked with the apparatus. The default wireless setting values may be values indicating that a wireless communication mode is an ad-hoc mode.

The data transceiver may receive an acknowledgement (ACK) signal, which has information that the reception of the wireless setting values has been completed, from the external device, and the connection establishment unit may change the wireless setting values to the wireless setting values stored in the storage unit after the ACK signal is received.

The external device may be one of a printer server and a printer remote control device.

According to another aspect of an exemplary embodiment of the present invention, there is provided a wireless communication system comprising: a first device changing wireless setting values from current wireless setting values to default wireless setting values if an event with a second device is sensed, transmitting the current wireless setting values to the second device, and changing the wireless setting values to the current wireless setting values after transmitting the current wireless setting values to the second device; and the second device setting wireless setting values to the default wireless setting values if an event with the first device is sensed and changing the current wireless setting values to received wireless setting values of the first device after the wireless setting values of the first device is received from the first device.

The event may be that the second device is docked into the first device. The second device may receive an acknowledgement (ACK) signal, which has information that the reception of the wireless setting values has been completed, from the first device, and the first device may restore the wireless setting values to the current wireless setting values before receiving the ACK signal from the second device. The first device may be a printer server, and the second device may be a printer remote control device.

According to another aspect of an exemplary embodiment of the present invention, there is provided a computer readable recording medium storing a computer readable program for executing the method of automatically establishing a wireless connection with an external device in a wireless communication network, the method comprising: establishing the wireless connection with default wireless setting values; receiving currently set wireless setting values of the external device from the external device; and establishing the wireless connection using the received wireless setting values of the external device.

According to yet another aspect of an exemplary embodiment of the present invention, there is provided a computer readable recording medium storing a computer readable program for executing the method of automatically establishing a wireless connection with an external device in a wireless communication network, the method comprising: storing currently set wireless setting values in a storage unit; changing settings of for the wireless connection to default wireless setting values; transmitting the wireless setting values stored in the storage unit to the external device; and changing the settings of for the wireless connection from the default wireless setting values to the wireless setting values stored in the storage unit.

According to a further aspect of an exemplary embodiment of the present invention, there is provided an apparatus for automatically establishing a wireless connection with an external device in a wireless communication network, the apparatus comprising: means for sensing whether an event with the external device occurs; means for receiving currently set wireless setting values of the external device from the external device; and means for establishing the wireless connection with default wireless setting values if the occurrence of the event is sensed, and for changing settings of the wireless connection to wireless setting values received from the external device if the wireless setting values are received from the external device.

According to yet another aspect of an exemplary embodiment of the present invention, there is provided an apparatus for automatically establishing a wireless connection with an external device in a wireless communication network, the apparatus comprising: means for sensing whether an event with the external device occurs; means for storing currently set wireless setting values in a storage unit if the generation of the event is sensed; means for transmitting the wireless setting values stored in the storage unit to the external device; and means for changing wireless setting values to default wireless setting values if the occurrence of the event is sensed, and for restoring the wireless setting values to the wireless setting values stored in the storage unit after the transmission of the wireless setting values are completed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
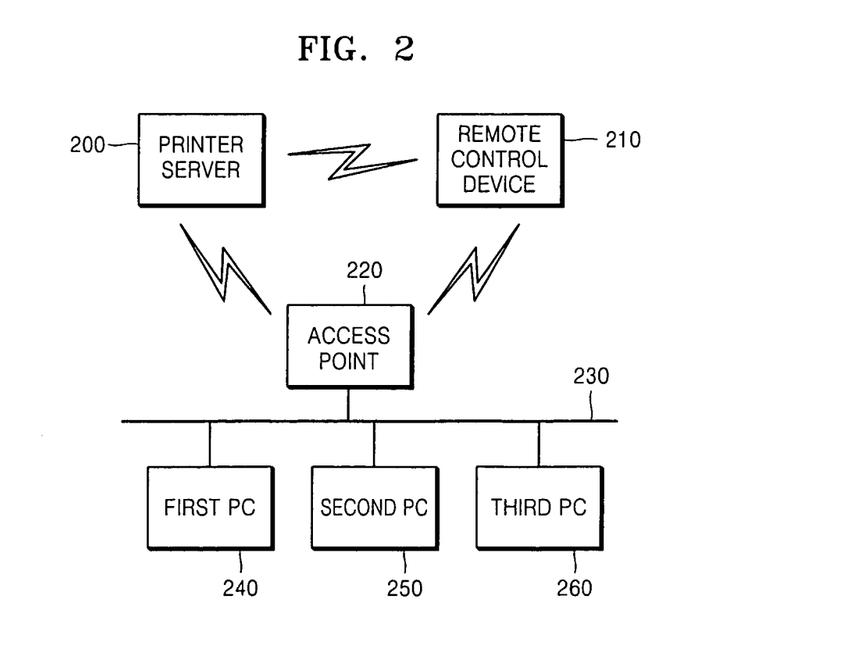
FIG. 2 is a block diagram of a network printer system using a wireless communication network according to an exemplary embodiment of the present invention.

FIG. 2 is a block diagram of a network printer system using a wireless communication network according to an exemplary embodiment of the present invention. Referring to FIG. 2, the network printer system includes a printer server 200, a remote control device 210, an access point 220, an Ethernet 230, a plurality of user PCs 240, 250, and 260.

The remote control device 210 wirelessly receives image data stored in the PCs 240, 250, and 260 via the Ethernet 230 and the access point 220. Further, the remote control device 210 displays the received images. Using the remote control device 210, a user checks the images stored in the PCs 240, 250, and 260, selects an image to be printed among the displayed images, and commands a printing job. Then, the remote control device 210 transmits data for the selected image to the printer server 200 using wireless data communication.

In addition, the remote control device 210 receives image data stored in a printer (not shown) and information about the printing job from the printer server 200 via wireless communication and displays the received images together with the printing job information. Thus, the user can manage the printing job using the remote control device 210.

A method and apparatus for automatically establishing a wireless connection between the printer server 200 and the remote control device 210 will now be described with reference to FIGS. 3 through 7.

Figure 3:
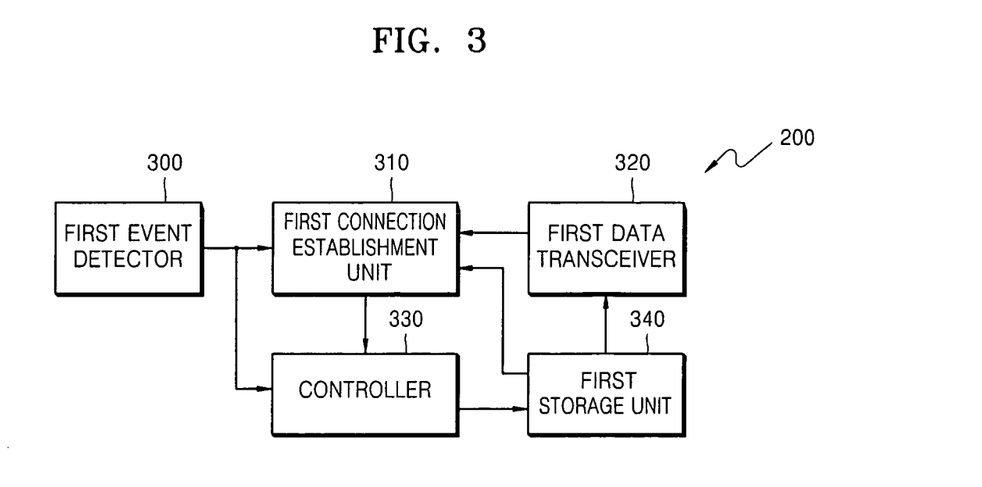
FIG. 3 is a block diagram of an automatic wireless connection set-up apparatus included in a printer server of FIG. 2.
Figure 4:
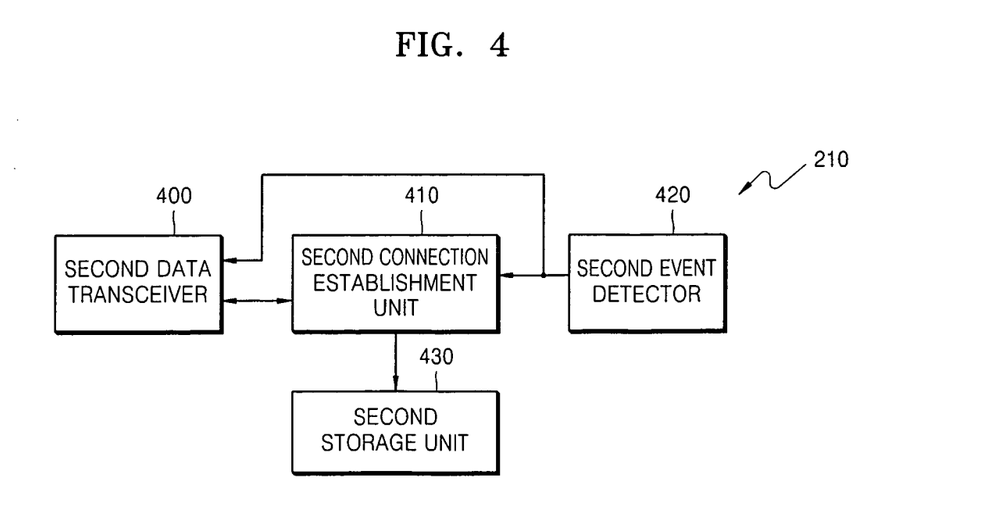
FIG. 4 is a block diagram of an automatic wireless connection set-up apparatus included in a remote control device of FIG. 2.

FIG. 3 is a block diagram of an automatic wireless connection set-up apparatus included in the printer server 200 of FIG. 2. The automatic wireless connection set-up apparatus illustrated in FIG. 3 includes a first event detector 300, a first connection establishment unit 310, a first data transceiver 320, a controller 330, and a first storage unit 340. FIG. 4 is a block diagram of an automatic wireless connection set-up apparatus included in the remote control device 210 of FIG. 2. The automatic wireless connection set-up apparatus illustrated in FIG. 4 includes a second data transceiver 400, a second connection establishment unit 410, a second event detector 420, and a second storage unit 430. A method of automatically establishing a wireless connection between the printer server 200 and the remote control device 210 using the automatic wireless connection set-up apparatuses illustrated in FIGS. 3 and 4 will now be described in conjunction with FIGS. 6 and 7, which are flowcharts of a method of automatically establishing a wireless connection according to exemplary embodiments of the present invention.

Figure 6:
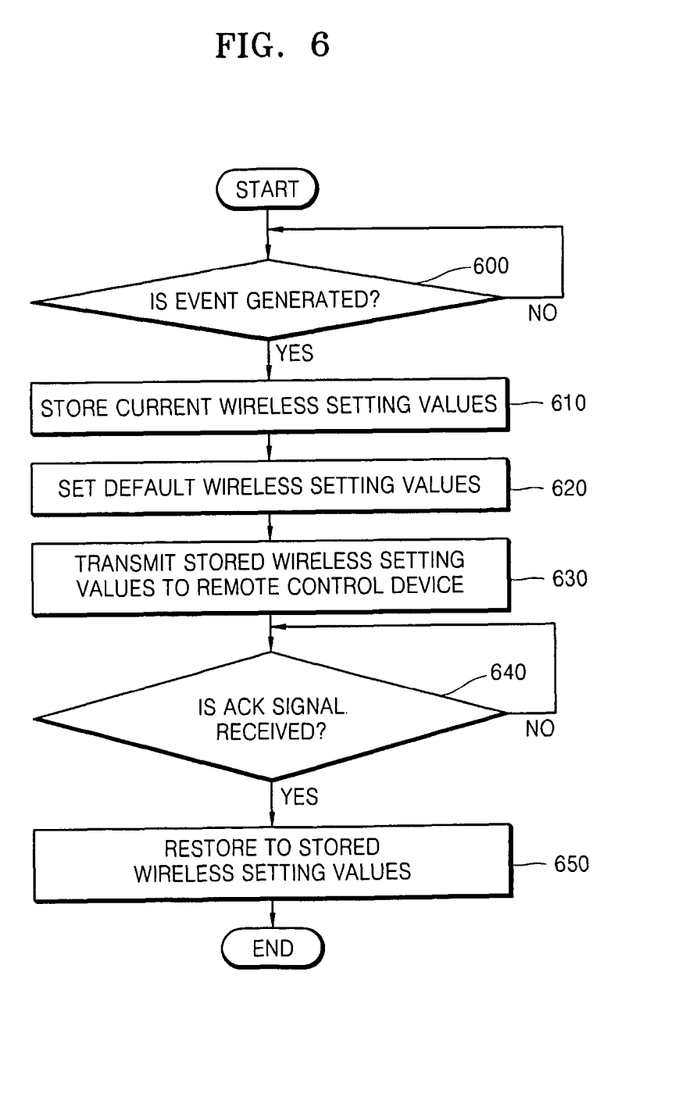
FIG. 6 is a flowchart of a method of automatically establishing a wireless connection in a wireless communication network according to an exemplary embodiment of the present invention.
Figure 7:
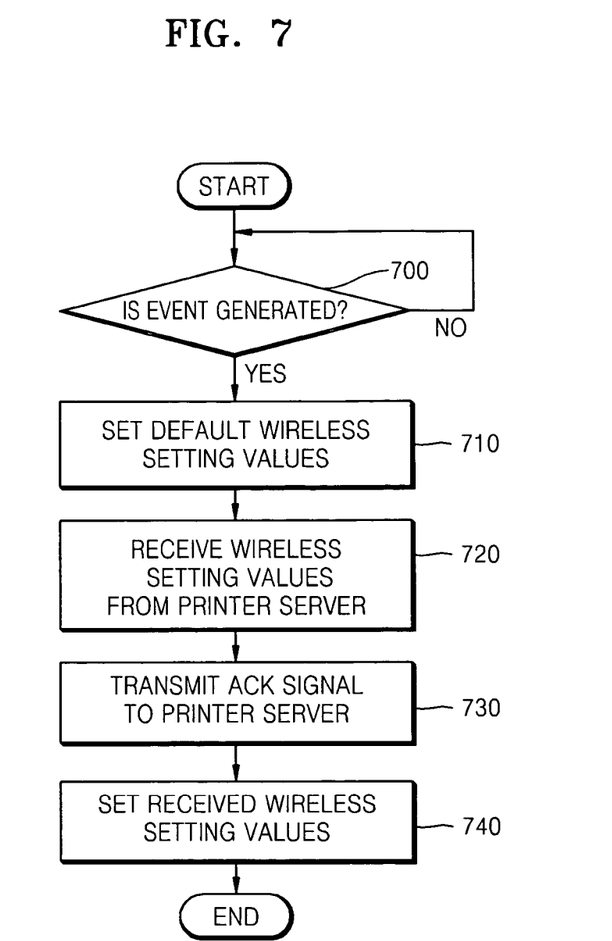
FIG. 7 is a flowchart of a method of automatically establishing a wireless connection in a wireless communication network according to another exemplary embodiment of the present invention.

FIG. 6 is a flowchart of a method of automatically establishing a wireless connection in the printer server 200, and FIG. 7 is a flowchart of a method of automatically establishing a wireless connection in the remote control device 210.

Figure 5:
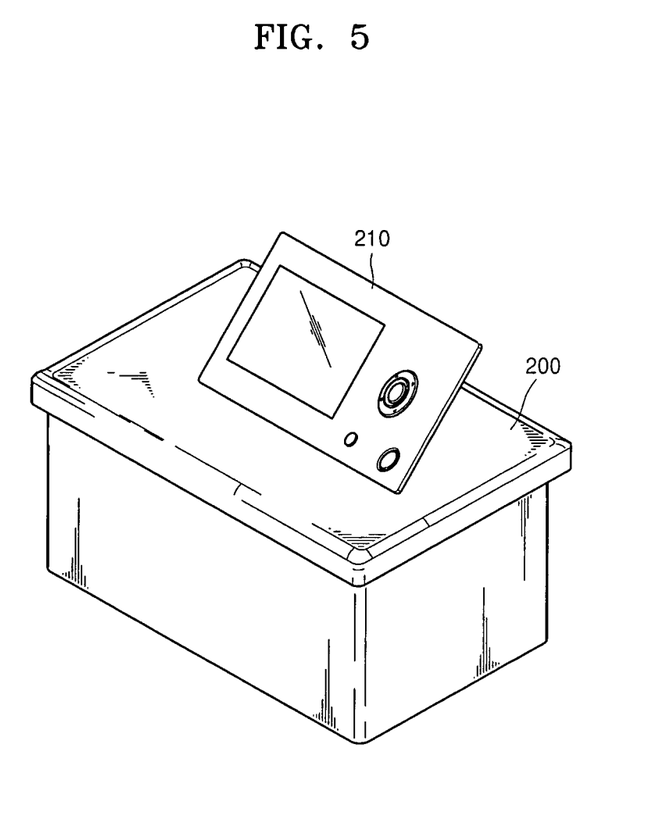
FIG. 5 is a perspective diagram for explaining a method of docking a remote control device in a printer server according to an exemplary embodiment of the present invention.

In operations 600 and 700, each of the first event detector 300 and the second event detector 420 senses whether an event occurs. The event is pre-defined and starts an automatic wireless connection set-up according to an exemplary embodiment of the present invention. For example, as illustrated in FIG. 5, when the remote control device 210 is docked into the printer server 200, the automatic wireless connection set-up job may start.

When the pre-defined event is generated, in operation 610, the controller 330 reads currently set wireless setting values of the printer server 200 from the first connection establishment unit 310 and stores the read current wireless setting values in the first storage unit 340. The wireless setting values may include setting values of operation mode, network name (SSID), channel, authentication, and encryption.

The first storage unit 340 and the second storage unit 430 have stored therein commonly defined default wireless setting values. As an example of the default wireless setting values, the operation mode may be an ad-hoc mode, the network name (SSID) may be Samsung, the channel may be 10, the authentication may be set for an open system, and the encryption may be set for no authentication.

In operation 620, the first connection establishment unit 310 reads the default wireless setting values from the first storage unit 340 and changes the settings of the wireless connection to the read default wireless setting values.

When the pre-defined event is generated, in operation 710, the second connection establishment unit 410 included in the remote control device 210 reads the default wireless setting values from the second storage unit 430 and changes the settings of the wireless connection to the read default wireless setting values.

When the above-described procedures are completed, the settings of the wireless connection of the printer server 200 and the remote control device 210 matched each other.

In operation 630, the first data transceiver 320 reads the current wireless setting values of the printer server 200, which is stored in the first storage unit 340 in operation 610, and transmits the read current wireless setting values of the printer server 200 to the remote control device 210.

The second data transceiver 400 receives the current wireless setting values of the printer server 200 in operation 720, and if the reception is completed, the second data transceiver 400 transmits an acknowledgement (ACK) signal, which has information that the reception of the wireless setting values is completed, to the printer server 200 in operation 730. The second connection establishment unit 410 changes the settings of the wireless connection of the remote control device 210 to the received current wireless setting values of the printer server 200 in operation 740.

The first data transceiver 320 of the printer server 200 waits until the ACK signal is received from the remote control device 210 in operation 640. If the ACK signal is received, the first connection establishment unit 310 reads the current wireless setting values stored in operation 610 from the first storage unit 340 and restores the original settings of the wireless connection to the read current wireless setting values, in operation 650.

While the wireless setting values of the remote control device 210 have been described above as being matched to the wireless setting values of the printer server 200, the wireless setting values of the printer server 200 can instead be matched to the wireless setting values of the remote control device 210.

In addition, although the method and apparatus for automatically establishing a wireless connection according to exemplary embodiments of the present invention is applied to a wireless connection between a printer server and a remote control device, the exemplary embodiments of the present invention can be used for establishing a wireless connection between all wireless communication devices besides a printer server and remote control device.

The exemplary embodiments of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, in a method and apparatus for automatically establishing a wireless connection according to exemplary embodiments of the present invention, by automatically matching wireless setting values of wireless communication devices to each other using pre-defined default wireless setting values, the inconvenience of a user having to personally match the wireless setting values of the wireless communication devices can be avoided. In particular, by automatically establishing a wireless connection between a printer server and a printer remote control device, convenience can be provided to a user using a network printer.

While certain exemplary embodiments of the invention has have been shown and described hereinwith reference to a certain preferred embodiments thereof, it will be understood by those skilled in the art that various changes in form and details may be made therein without departing from the spirit and scope of the invention as defined by the appended claims and their equivalents.

What is claimed is:

1. A method, performed in a print server, of automatically establishing a wireless connection with a printer remote control device in a wireless communication network, the method comprising:
    backing up wireless network setting values currently in use by the print server in response to the printer remote control device being docked to the print server;
    initializing the wireless network setting values of the print server to default wireless network setting values, which setting values are similarly predefined for both the print server and the printer remote control device;
    establishing a first wireless connection between the print server and the printer remote control device based on the wireless network setting values initialized to the default wireless network setting values;
    transmitting the backed up wireless network setting values to the printer remote control device via the first wireless connection;
    receiving an acknowledgement message verifying that the backed up wireless network setting values were completely received from the print server;
    disconnecting the first wireless connection and restoring the wireless network setting values of the print server to the backed up wireless network setting values, in response to said receiving the acknowledgement message; and
    establishing a second wireless connection between the print server and the printer remote control device based on the restored wireless network setting values,
    wherein the printer remote control device receives images from at least one of a plurality of computing devices, transmits data to the print server using the second wireless connection for printing a selected image via the print server, and receives information corresponding to printing jobs from the print server via the second wireless connection and the selected image is selected by a user from the received images.

2. A method, performed in a printer remote control device, of automatically establishing a wireless connection with a printer server in a wireless communication network, the method comprising:
    sensing a docking of the printer remote control device to the printer server;
    establishing a first wireless connection between the printer remote control device and the printer server in response to said sensing the docking and based on default wireless network setting values similarly predefined for the printer remote control device and the printer server;
    receiving custom wireless network setting values from the printer server via the first wireless connection;
    transmitting an acknowledgement message in response to the custom wireless network setting values being completely received;
    disconnecting the first wireless connection and changing wireless network setting values of the printer remote control device from the default network setting values into the custom wireless network setting values; and
    establishing a second wireless connection between the printer remote control device and the printer server based on the custom wireless network setting values,
    wherein the printer remote control device receives images from at least one of a plurality of computing devices, transmits data to the print server using the second wireless connection so as to print a selected image via the print server, and receives information about printing jobs from the print server via the second wireless connection and the selected image is selected by a user from the received images.

3. An apparatus, in a printer server, for automatically establishing a wireless connection with a printer remote control device in a wireless communication network, the apparatus comprising:
    an event detector for sensing an event with respect to the printer remote control device, the event including the printer remote control device being docked with the apparatus;
    a controller for backing up wireless network setting values currently used for the printer server, in response to the sensing of the event;
    a connection establishment unit for initializing the wireless network setting values of the printer server to default wireless network setting values which are similarly predefined for the both the printer server and the printer remote control device and establishing a first wireless connection between the printer server and the printer remote control device based on the wireless network setting values initialized to the default wireless network setting values; and
    a data transceiver for transmitting the backed up wireless network setting values to the printer remote control device via the first wireless connection and receiving an acknowledgement message verifying that the backed up wireless network setting values were completely received from the printer server,
    wherein the connection establishment unit disconnects the first wireless connection and restores the wireless network setting values of the printer server into the backed up wireless network setting values in response to receiving the acknowledgement message, and establishes a second wireless connection between the printer server and the printer remote control device based on the restored wireless network setting values and the printer remote control device receives images from at least one of a plurality of computing devices, transmits data to the apparatus using the second wireless connection so as to print a selected image, and receives information about printing jobs from the printer server via the second wireless connection and the selected image is selected by a user from the received images.

4. The apparatus of claim 3, wherein the default network setting values are values indicating that a wireless communication mode is an ad-hoc mode.

5. An apparatus, in a printer remote control device, for automatically establishing a wireless connection with a printer server in a wireless communication network, the apparatus comprising:
   an event detector for sensing whether the printer remote control device is docked to the printer server;
   a connection establishment unit for establishing a first wireless connection between the printer remote control device and the printer server based on default wireless network setting values which are similarly predefined for both the printer remote control device and the printer server; and
   a data transceiver for receiving custom wireless network setting values from the printer server via the first wireless connection and transmitting an acknowledgement message verifying that the custom wireless network setting values were completely received,
   wherein the connection establishment unit disconnects the first wireless connection and changes wireless network setting values of the printer remote control device from the default wireless network setting values into the custom wireless network setting values when the acknowledgement message is transmitted, and establishes a second wireless connection between the printer remote control device and the printer server based on the custom wireless network setting values, and the printer remote control device receives images from at least one of a plurality of computing devices, and transmits data to the printer server using the second wireless connection so as to print a selected image via the printer server, and receives information about printing jobs from the printer server via the second wireless connection and wherein the selected image is selected by a user from the received images.

6. The apparatus of claim 5, wherein the default network setting values are values indicating that a wireless communication mode is an ad-hoc mode.

7. A wireless communication system comprising a first device and a second device, wherein the first device changes wireless setting values from custom wireless setting values to default wireless setting values in response to sensing an event with a second device transmitting the custom wireless setting values to the second device, and changes the wireless setting values to the custom wireless setting values after transmitting the custom wireless setting values to the second device and receiving an acknowledgment message; and
   the second device changes wireless setting values to the default wireless setting values in response to sensing an event with the first device and changes the wireless setting values to received custom wireless setting values of the first device after the wireless setting values of the first device is received from the first device and an acknowledgement message is received,
   wherein the event includes the second device being docked with the first device, the first device includes a printer server and the second device includes a printer remote control device and the printer remote control device receives images from at least one of a plurality of computing devices, and transmits data to the printer server so as to print a selected image via the printer server and the receiving and transmitting using the wireless connection having the custom wireless setting values and the selected image is selected by a user from the received images, and
   wherein further the printer server receives the acknowledgement message, which indicates that the reception of the custom wireless setting values has been completed, from the printer remote control device, and the printer server restores the wireless setting values to the current wireless setting values before receiving the acknowledgement message from the printer remote control device.

8. A non-transitory computer readable recording medium storing a computer readable program for executing the method of claim 1.

9. A non-transitory computer readable recording medium storing a computer readable program for executing the method of claim 2.

10. An apparatus, in a printer server, for automatically establishing a wireless connection with an external device in a wireless communication network, the apparatus comprising:
   means for sensing an event with respect to the printer remote control device, the event including the printer remote control device being docked with the apparatus;
   means for backing up wireless network setting values currently used for the printer server, in response to the sensing of the event;
   means for initializing the wireless network setting values of the printer server to default wireless network setting values which are similarly predefined for the both the printer server and the printer remote control device and establishing a first wireless connection between the printer server and the printer remote control device based on the wireless network setting values initialized to the default wireless network setting values; and
   means for transmitting the backed up wireless network setting values to the printer remote control device via the first wireless connection and receiving an acknowledgement message verifying that the backed up wireless network setting values were completely received from the printer server,
   wherein the means for initializing disconnects the first wireless connection and restores the wireless network setting values of the printer server into the backed up wireless network setting values in response to receiving the acknowledgement message, and establishes a second wireless connection between the printer server and the printer remote control device based on the restored wireless network setting values and the printer remote control device receives images from at least one of a plurality of computing devices, transmits data to the apparatus using the second wireless connection so as to print a selected image, and receives information about printing jobs from the printer server via the second wireless connection and the selected image is selected by a user from the received images.

11. An apparatus, in a printer remote control device, for automatically establishing a wireless connection with a printer server in a wireless communication network, the apparatus comprising:
   means for sensing whether the printer remote control device is docked to the printer server;
   means for establishing a first wireless connection between the printer remote control device and the printer server based on default wireless network setting values which are similarly predefined for both the printer remote control device and the printer server;

means for receiving custom wireless network setting values from the printer server via the first wireless connection and transmitting an acknowledgement message verifying that the custom wireless network setting values were completely received, wherein the means for establishing a first wireless connection disconnects the first wireless connection and changes wireless network setting values of the printer remote control device from the default wireless network setting values into the custom wireless network setting values when the acknowledgement message is transmitted, and establishes a second wireless connection between the printer remote control device and the printer server based on the custom wireless network setting values, and the printer remote control device receives images from at least one of a plurality of computing devices, and transmits data to the printer server using the second wireless connection so as to print a selected image via the printer server, and receives information about printing jobs from the printer server via the second wireless connection and wherein the selected image is selected by a user from the received images.

* * * * *